3,339,701
PHASE CONVERSION CONVEYOR SYSTEM
Robert J. Weichhand, Fort Wright, Ky., assignor to
R. A. Jones & Company, Inc., Covington, Ky., a corporation of Kentucky
Filed Oct. 3, 1966, Ser. No. 583,790
12 Claims. (Cl. 198—32)

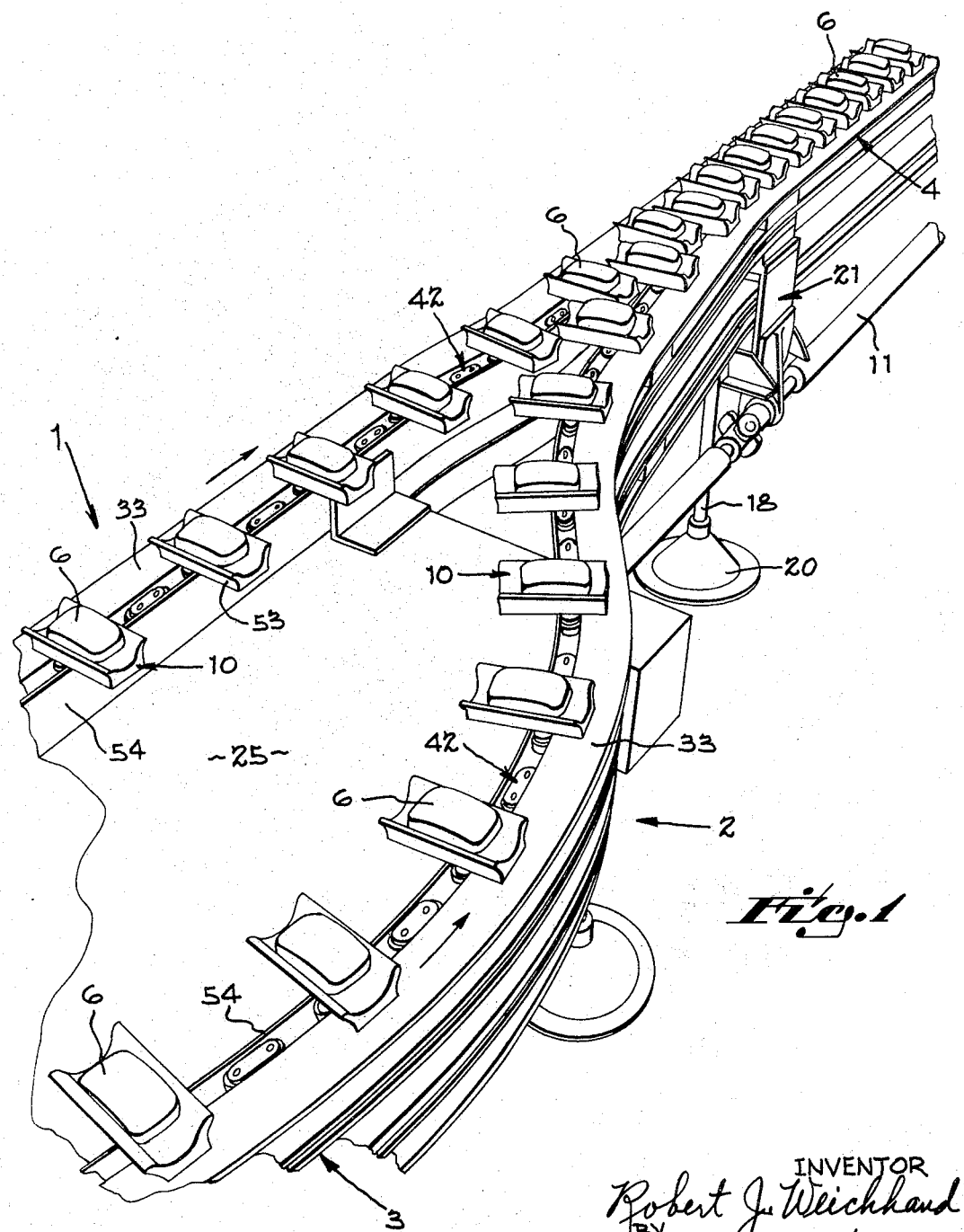

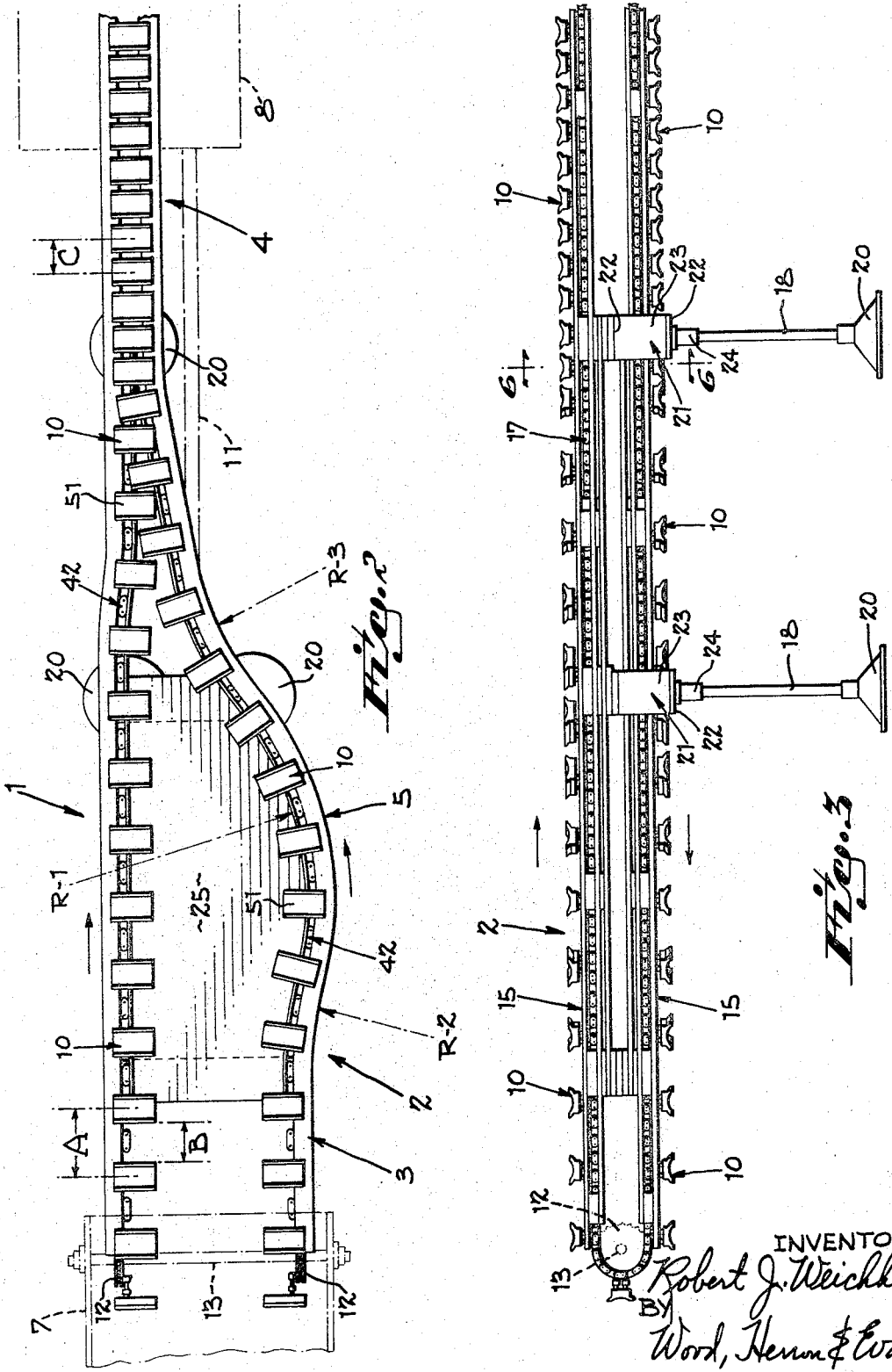

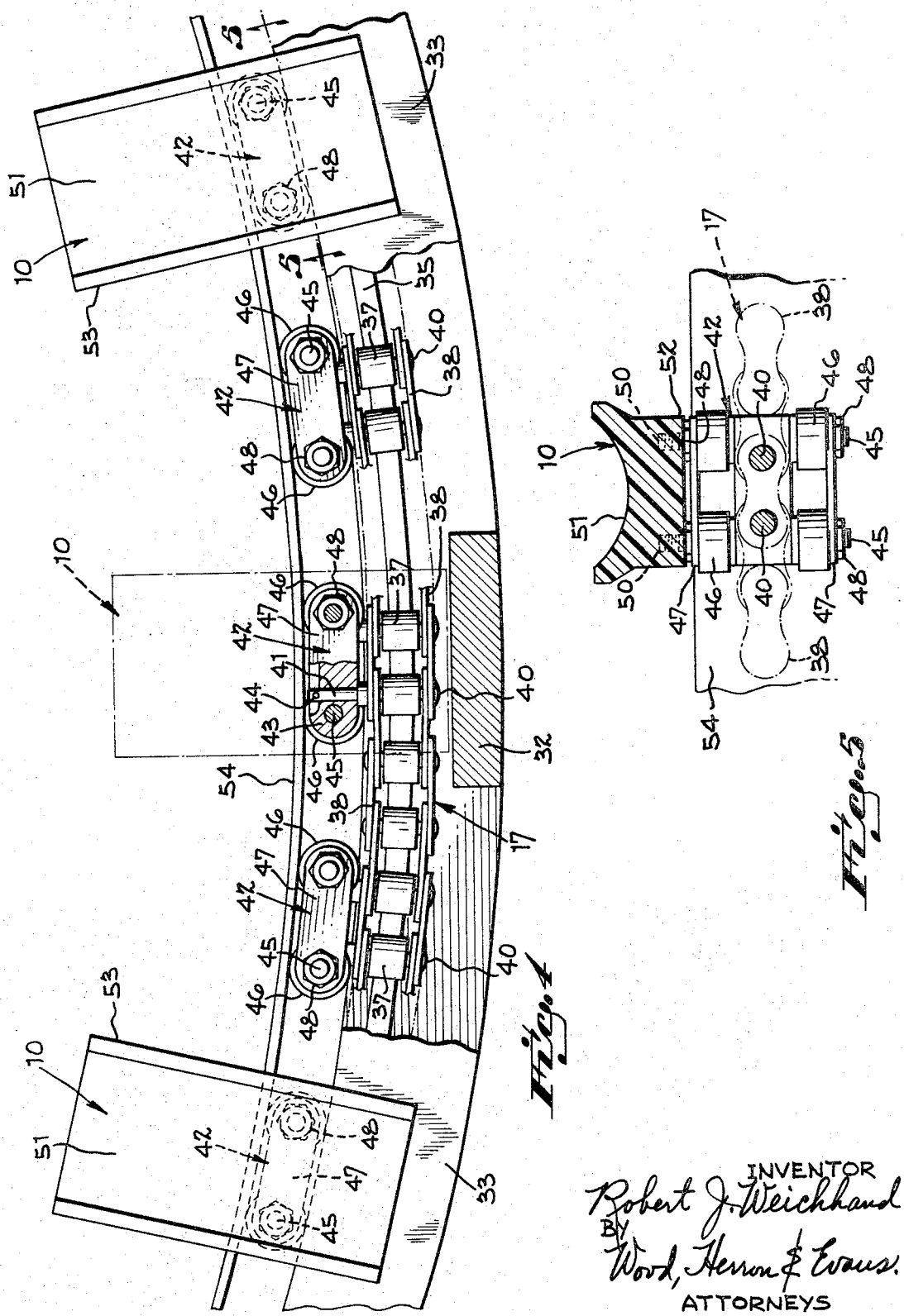

This invention relates generally to transport conveyor systems and more particularly to a phase conversion system which is arranged to transfer articles relative to several stations or processing machines in an orderly, predetermined sequence.

A primary objective of the invention has been to provide a conveyor system adapted to receive multiple articles as they are discharged from two or more stations or processing machines at points spaced laterally from one another and to convey the articles along two or more transport lines, then to merge the lines to a contiguous relationship so as to advance the articles in single line formation to and through a single station or processing machine.

In the present example, which has been selected to illustrate the principles of the invention, the phase conversion conveyor system is utilized to transport cakes of soap from a dual soap press which forms two cakes of soap during each cycle and discharges the two cakes in phase with one another to two laterally spaced transport conveyor runs having buckets advancing in phase with one another and in phase with the press. The two separate lines of buckets, which are in phase and in time with one another, are aligned laterally as they advance from the press and are subsequently merged into single line formation, then advanced through a cartoning machine. The cartoning machine then transfers the soap cakes (advancing in line formation) laterally into respective cartons, which advance alongside the individual in-line buckets of the straight line portion of the conveyor system. For this purpose, the cartoning machine, in the present example, is provided with a transfer mechanism which shifts the individual soap cakes laterally from the buckets into the open ends of the cartons which are aligned with the ends of the buckets.

Another objective of the invention has been to provide a simplified phase conversion conveyor system in which one of the laterally spaced conveyor runs includes a "side bow" or curved section which lengthens the line of travel of the buckets along that run by a predetermined distance relative to the buckets of the other run, causing the two rows of in-phase buckets to become rearranged to a staggered or out of phase relationship, adapting the buckets of the two runs to merge with one another to form a single, interleaved row of buckets along the single line conveyor section.

According to this aspect of the invention, the two laterally spaced conveyor runs are both advanced at the same speed from the dual soap press (in time with the press cycles) to the cartoning machine, with the buckets along the laterally spaced runs in phase with one another until the buckets advance along the side bow section, which is inserted in one of the spaced runs. The buckets are spaced apart from one another, in the direction of advancement, along the two runs a distance substantially greater than the width of the individual buckets so that the buckets of the two runs may be interleaved alternatively with one another to form the single row of buckets along the straight line section.

As the buckets negotiate the side bow section of one of the conveyor runs, the line of travel of those buckets is increased by the developed length of the curved side bow section. The increase in the developed length is equal to one-half the lineal spacing of the buckets. As a consequence, the buckets, which negotiate the side bow section, are retarded by a distance equal to one-half the lineal spacing of the buckets, that is, they are thrown out of phase with the row of buckets on the companion run by that lineal distance, permitting the two rows of out-of-phase buckets to merge alternately with one another along the straight line section for advancement through the cartoning machine.

A further objective has been to provide a simplified transport chain and guide construction which is adapted to flex in the horizontal plane in passing about the side bow section and in the vertical plane in passing about the sets of sprockets at opposite ends of the conveyor system, and also to support the buckets.

According to this aspect of the invention, the chain runs each comprise a transport chain passing about the sprockets and flexing in a vertical plane in the normal way. However, in order to permit lateral flexing, that is, in the horizontal plane, in passing around the side bow section, the links of the chain are provided with clearance adapting the links to assume slightly angular positions with respect to one another. In addition, each chain run includes carrier links connected to the transport chain and connected individually to the sets of rollers of the transport chain for supporting the buckets or article carriers.

The conveyor runs include guides for the transport chains and also guides for the carrier links, the arrangement being such that the guides for the transport chains support the chains in the horizontal plane, while the guides for the carrier links support the carrier links and buckets in the vertical plane and also guide the carrier links, buckets and transport chains around the side bow sections. In order to permit the buckets to assume their interleaved in-line position, the buckets, which are supported by the carrier links, are offset laterally and symmetrically in opposite directions relative to one another so that one set of buckets overhangs the carrier links of the companion set of buckets. The arrangement is such that both rows of buckets are aligned with one another along the straight line section for passage through the cartoning machine.

From the foregoing, it will be understood that the side bow principle of this invention can be applied to other conveyor systems utilizing a greater number of processing machines by appropriate rearrangement of the conveyor runs, side bow magnitude and bucket spacing, whereby more than two processing machines may serve a single cartoner or other machine. It will also be understood that the side bow alignment and timing principle may be applied to conveyor system of types other than that which has been disclosed herein, for example, the overhead hanger type conveyor system in which the article carriers comprise hangers or the like.

The various features and advantages of the invention will be more clearly apparent to those skilled in the art from the following detailed description taken in conjunction with the drawings.

In the drawings:

FIGURE 1 is a fragmentary perspective view illustrating a section of the double run conveyor system of this invention.

FIGURE 2 is a top plan view of the conveyor system.

FIGURE 3 is a side elevation of the conveyor system as projected from FIGURE 2.

FIGURE 4 is an enlarged fragmentary top plan view of a portion of the curved or side bow section of the conveyor system.

FIGURE 5 is a sectional view taken along line 5—5 of FIGURE 4 detailing the construction of one of the conveyor buckets and transport chain.

*General arrangement*

Figure 6:
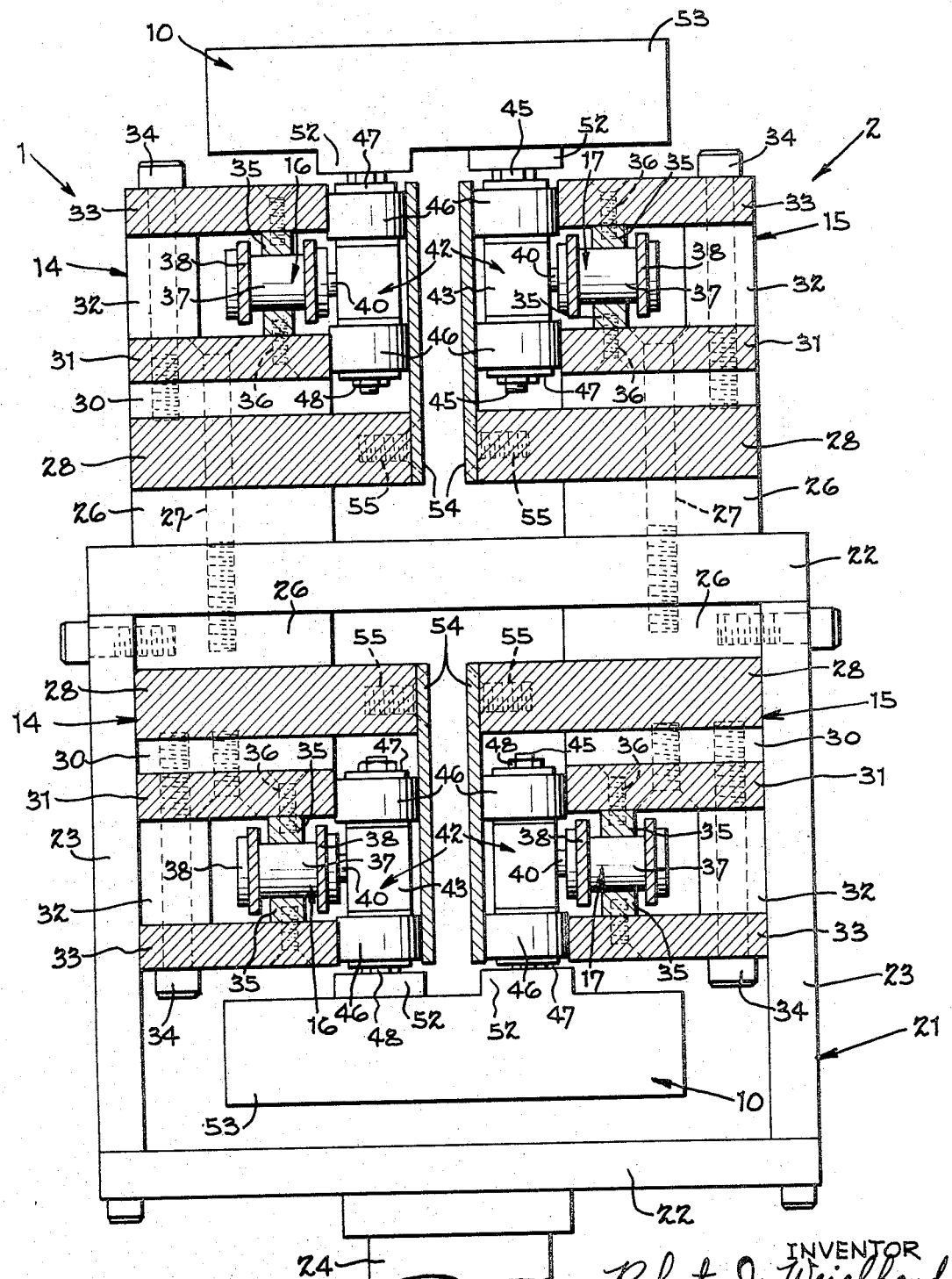
FIGURE 6 is an enlarged cross-sectional view taken along line 6—6 of FIGURE 3, detailing the chain guides of the conveyor system.

As best shown in FIGURES 1–3, a conveyor system illustrating the principles of the present invention essentially comprises two chain-type bucket transport conveyor runs, indicated generally at 1 and 2, spaced laterally and extending generally in parallelism with one another. The conveyor run 1 extends in a straight line, while the conveyor run 2 includes a first straight section 3 parallel with but spaced from the straight section 1. The conveyor run 2 further includes a second straight section 4, which is contiguous to and aligned with a portion of the straight section 1. The two sections 3 and 4 of run 2 are joined by a side bow or side bend section 5 which lengthens the line of travel of the conveyor run 2 so that the in-phase buckets of the two sections merge or dove-tail along the straight line contiguous section 4 having to form a single row of aligned buckets for timed advancement sequentially through the cartoning machine.

In the present example, the conveyor system is utilized to convey cakes of soap 6 (FIGURE 1) from a soap press of the dual type, as indicated diagrammatically in broken lines at 7 (FIGURE 2), and to convey the soap cakes 6 to a cartoning machine, which is indicated in broken lines at 8 in FIGURE 2. In advancing through the cartoning machine, the cakes are inserted into individual cartons which are subsequently closed and discharged from the machine.

The soap press 7 is conventional and well known in the art; therefore, it has not been disclosed in detail. Generally speaking, the soap press 7, for which the conveyor system is intended, includes suitable feeding means and dual pressing dies which form the cakes 8 in phase, that is, two cakes upon each cycle. The press includes suitable feed means for discharging the pressed cakes 8 into the buckets 10 of the conveyor system. It is to be noted at this point (FIGURE 2), that the buckets 10 along the straight sections 1 and 3 advance in alignment or in phase with one another and also in time with the cycles of operation of the soap press 7, so that pairs of cakes 6 advance in parallel, side-by-side relationship from the dual soap press. Upon reaching the straight line contiguous section 4, the side-by-side cakes are integrated into the single sequential row, and in this relationship, advance through the cartoning machine 8.

The cartoning machine 8 is also well known in the art. In general, the typical cartoning machine comprises a carton feed mechanism which erects the cartons from a flat collapsed condition and feeds them into a carton conveyor in erected condition in a horizontal plane, with at least one end open. The carton conveyor extends parallel with the article conveyor, in the present example, the contiguous section 4, with the cartons aligned individually with the buckets 10, and with the open ends of the cartons presented to the ends of the buckets.

A transfer mechanism advances along a path parallel with the contiguous conveyor section 4 which extends throughout the length of the cartoning machine 8. The transfer mechanism is arranged to displace the articles (soap cakes 6) laterally from the buckets 10 into the open ends of the cartons. After the articles have been transferred, the open ends of the cartons, which usually include flaps, are closed, then the loaded cartons are discharged from the machine.

It will be understood, that in the present soap press-cartoner combination, the soap press, the conveyor system, and the cartoning machine all operate in timed relationship with one another. In other words, the three pieces of equipment are driven from a common source of power and interconnected with one another by a suitable driving system.

In the present example, the cartoning machine 8 includes a power motor which drives its components; the cartoning machine also includes a drive shaft 11 (FIGURES 1 and 2) which extends from the cartoning machine 8 to the soap press 7. Thus, the soap press, by operation of shaft 11, is driven in synchronism with the cartoning machine. The conveyor system preferably is driven by the cartoning machine which includes a pair of driving sprockets (not shown), meshing with the chains of the two conveyor runs 1 and 2.

Accordingly, the upper runs of the conveyor system are pulled from the soap press 7 toward the cartoning machine 8 in the downstream direction, as indicated by the arrows in FIGURES 2 and 3. The upstream end of the conveyor runs 1 and 2 pass around the idler sprockets 12—12, which are carried upon the cross shaft 13. The cross shaft 13 is carried by the frame of the soap press 7.

*Conveyor structure*

As best shown in FIGURES 3 and 6, the conveyor runs 1 and 2 are identical to one another but are disposed in symmetrically opposite relationship. Thus, the conveyor run 1 comprises upper and lower chain guides 14—14 and the conveyor run 2 comprises upper and lower chain guides 15—15. The conveyor run 1 includes a transport chain having upper and lower runs 16—16 and the conveyor run 2 is provided with a transport chain having upper and lower chain runs 17—17. The two chain guides 14 and 15, along the contiguous section, previously indicated at 4 (FIGURE 2) are assembled as a composite structure, as described below.

The opposite end portions of the chain guides 14 and 15 are supported by the soap press 7 and by the cartoning machine 8, while the portion which spans the two machines is supported by spaced vertical posts 18 (FIGURES 2 and 3). The lower end of each post includes a base member 20 which rests upon the floor; the upper end of each post 18 includes a support bracket 21.

As shown in FIGURE 6, the bracket 21, which supports the contiguous section 4 (chain guides 14 and 15 in assembly) is generally square, consisting of upper and lower horizontal pieces 22 and spaced vertical plates 23. Each lower cross piece 22 includes a socket fitting 24 seated upon the post 18 and supporting the bracket 21.

It will be noted in FIGURE 2, that the chain guides of the side bow section 5 and straight section 1 are supported by individual posts 18 which include similar brackets 21. In this instance, the brackets 21 are modified slightly in width so as to embrace the single guides, as distinguished from the two guides of the contiguous section 4. It will be noted at this point, that the straight conveyor run 1 (FIGURE 2), and the side bow section 5 include a horizontal spacer plate 25 which holds the two sections in spaced relationship.

Upon reaching the sprockets at the downstream end of the conveyor system beyond the cartoning machine 8, the buckets return along the same path but in the reverse order. In other words, the lower or return guides 14 and 15 (FIGURE 6) are identical to their companion upper guides 14 and 15, including the straight contiguous section 4, the two conveyor runs 1 and 2 and the side bow section 5. Accordingly, the returning buckets diverge from one another as they leave the lower contiguous section 4 and pass around the lower side bow section so that they advance in phase with one another to the dual soap press to receive the cakes of soap, as described earlier.

Since the two chain guides 14—14 and 15—15 are in duplicate, the following description of one of the guides applies to both sets of upper and lower guides. As shown in FIGURE 6, the upper guides 14 and 15 are both supported upon the upper cross piece 22 of bracket 21 by means of respective spacers 26—26. The chain guides are secured to the spacers by screws 27—27 threaded into the cross piece 22.

The chain guide, in each case, includes a horizontal base plate 28 seated upon the spacer 26, the base plate providing a support for the several guide members which constitute the chain guides. The base plate 28 includes a spacer 30 on its upper surface; a horizontal guide rail 31 is seated directly upon the spacer 30. A second spacer 32 is seated upon the guide rail 31 and a second horizontal guide rail 33 is seated upon the spacer 32. It will be noted in FIGURE 6 that the guide rails 31 and 33 are spaced apart from one another and project in cantilever fashion from the spacer 32. The two horizontal guide rails 31 and 33 are secured to the spacer 32 by a screw or series of screws 34.

The edges of the horizontal guide rails 31 and 33, which project outwardly from spacer 32, are provided with opposed chain guide bars 35—35, which are secured in place by screws 36 passing through the rails 31 and 33. The transport chains 16 and 17 track between the guide bars 35—35 and support the chain runs in the horizontal plane.

As viewed in FIGURE 4, each transport chain 16 or 17 includes rollers 37 connected by pivot links and roller links 38 in the usual manner. The rollers 37 are journalled upon pins 40 in the usual way. In order to permit side flexing in the horizontal plane for passage of the chain run around the side bow section 5 (FIGURES 2 and 4) the pins 40 pass through the links 38 with predetermined clearance, adapting the links of the transport chain to flex slightly relative to one another in negotiating the curves.

It will be noted in FIGURE 4 that the pins 40 include extended portions 41 which pass through individual carrier links 42. Thus, the transport chains 16 and 17 support the load in the vertical plane by operation of the guide bars 35—35, while the carrier links 42 guide the chains in the horizontal plane and support the conveyor buckets 10.

In the present disclosure (FIGURES 4–6), each pair of transport chain rollers 37 includes one carrier link 42; however, the buckets 10 are carried by each alternate carrier link 42 in order to space the buckets 10 properly with respect to one another. By virtue of this arrangement, each alternate carrier link 42, which does not support a bucket 10, acts as an idler and serves to guide the chain runs about the curved or side bow section 5. Thus, while the guide rollers 37 support and guide the buckets 10 in the horizontal plane, the carrier links 42, while supporting the buckets 10, also guide the chain runs around the curved or side bow section 5.

Described in detail, each carrier link 42 comprises a solid link piece 43 (FIGURE 4) of elongated shape and having a pair of cross bores to receive the pin extensions 41—41 of the transport chain. The end portion of each pin extension 41, which projects beyond the link piece 43, includes a cross pin 44 to lock the link piece 43 to the pin extension.

Each link piece 43 includes a record pair of bores extending at right angles to the pin extension 41. Respective vertical roller pins 45—45 (FIGURES 4–6) pass through the bores of the link piece 43 and project outwardly beyond opposite sides of the link piece. Respective pairs of rollers 46—46 are journalled upon the vertical pins 45 and are located at opposite sides of the solid link pieces 43. Each link piece 43 further includes a pair of elongated keeper plates 47—47 corresponding in shape with the link piece 43. The keeper plates 47 include pairs of holes in registration with the roller pins 45. The keeper plates 47 are seated against the outside surface of the rollers 46 and nuts 48 and retain the keeper plates in position on opposite sides of the rollers.

It will be noted in FIGURE 5, that the upper end portions of the vertical roller pins 45 project upwardly beyond the nuts 48 and are threaded at 50. The threaded end portions 50 of the pins 45 are utilized in attaching the buckets 10 to the carrier link 42.

As viewed in FIGURE 5, each bucket 10, in the present example, may be formed of a plastic material, and each bucket includes a concave recess 51 extending lengthwise. Each bucket further includes a lug portion 52 (FIGURES 5 and 6) formed on its lower surface. Each lug 52 includes a pair of threaded bores, the threaded end portions 50 of the vertical roller pins 45 being screwed into the bores of the lug 52.

It will be noted (FIGURE 6) that the lugs 52 are located in an off-centered position with respect to the length of buckets 10. The arrangement is such that a portion 53 of each bucket extends inwardly beyond the lug 52 and beyond its guide structure and in cantilever fashion above the companion guide structure. Thus, bucket 10, which is supported by the guide structure 14 overhangs the companion guide structure 15 along the contiguous section 4 of the conveyor system. In the same manner, the buckets 10 along the guide structure 15 overhang the guide structure 14, such that the alternate buckets 10 of the two runs are symmetrically staggered toward one another, upon being brought into alignment along the contiguous section.

As best shown in FIGURE 6, the two chain guides 14 and 15 (upper and lower runs) each include a vertical guide plate 54, secured to the base plate 28 by screws 55. The guide plate 54 is spaced outwardly from the working edges of the two horizontal guide rails 31 and 33 so as to provide a trackway for the rollers 46 of the carrier links 42. It will be understood that the horizontal guide rails 31 and 32 coact with the companion guide plates 54, 31 and 33 to support the overhanging buckets 10 in their horizontal planes; the coacting plates also guide the transport chains and buckets 10 about the side bow section of the conveyor. It is to be noted that the carrier links 42 are not connected to one another in order to avoid any interference or resistance as the chain runs pass around the drive and idler sprockets of the system.

In the present example, the center-to-center distance in between the buckets 10 of the conveyor runs 1 and 2, as indicated at A in FIGURE 2, is substantially greater than the width of the buckets 10, leaving the space B between the buckets. When the two sets of buckets are interleaved along the contiguous section 4, the relationship of the bucket spacing A and spacing B locates the laternate buckets of the two sets at a center-to-center distance indicated at C in FIGURE 2. This distance is compatible with the transfer mechanism of the cartoning machine and coincides with the spacing of the cartons as the soap cakes are transferred from the buckets into the cartons.

In the present example, the side bow section 5 comprises a compound curve consisting of the major radius indicated at R–1 and the two minor radii indicated at R–2 and R–3. The minor radii R–2 and R–3 blend with the radius R–1. The radii R–1, R–2 and R–3 of the side bow section combine to develop sufficient length to the straight section 3 to place the in-phase buckets along the straight sections 3 into interleaved relationship, as indicated by the spacing C in FIGURE 2. It will be understood that the side bow section 5 may be developed along compound curves other than those disclosed in this application in order to bring about the predeterminel length differential.

I claim:

1. A conveyor system adapted to transport articles relative to a plurality of stations comprising:

a plurality of conveyor runs extending between said stations and arranged to serve said stations;

a plurality of article carriers spaced apart from one another along said runs, said carriers being joined to said conveyor runs and arranged to transport articles relative to said stations;

said conveyor system including a first conveyor section wherein said runs are displaced laterally apart from one another, said article carriers being arranged to advance in phase with one another along said first conveyor section;

said conveyor system including a contiguous section wherein said runs are disposed generally in parallelism with and adjacent to one another;

one of said conveyor runs having an irregular section interconnecting one of said first laterally spaced runs to one of said contiguous runs;

said irregular section adapted to increase the developed length of the said conveyor run a sufficient distance to throw said in-phase article carriers of said first, laterally displaced conveyor runs out of phase with respect to one another upon advancement along the irregular section, whereby said article carriers merge alternately with one another into interleaved relationship during advancement along said contiguous section for transport of the carriers sequentially with respect to one of said stations.

2. A conveyor system as set forth in claim 1 in which the irregular section increases the developed length of the conveyor run, into which it is inserted, by a distance equal to one-half the spacing of the article carriers along the conveyor runs, thereby to relocate the alternate carriers of the runs into equally spaced, alternate sequential relationship along the contiguous conveyor section.

3. A conveyor system as set forth in claim 2 in which the article carriers of the conveyor runs are displaced laterally from the conveyor runs toward one another, thereby to relocate the carriers in line formation and in sequential alignment when the carriers are interleaved along the contiguous section of the conveyor system.

4. A conveyor system as set forth in claim 1 in which the irregular section comprises a compound curve having opposite ends blending with one of said laterally spaced runs and blending with one of the runs of the contiguous conveyor system, the developed length of the irregular curve increasing the developed length of said run a distance equal to one-half the spacing of the article carriers.

5. A conveyor system as set forth in claim 1 which comprises two conveyor runs disposed in a generally horizontal plane and in which the first section consists of two laterally spaced runs and in which the contiguous conveyor section comprises two adjacent parallel runs, one of said runs extending in a straight line along the first section and along the contiguous section, the other of said runs including said irregular section which joins the laterally spaced section to the contiguous conveyor section.

6. A conveyor system as set forth in claim 5 in which the conveyor system includes upper and lower runs and upper and lower guideways for said runs, the upper guideway supporting a forward run of the conveyor system and the lower guideway supporting a return run of the conveyor system, said upper guideway guiding the runs of the first, laterally spaced section, the irregular section, and the contiguous section, the lower guideway having a configuration coinciding generally with the upper guideway, whereby the return conveyor run follows a path generally similar to the forward conveyor run.

7. A conveyor system adapted to serve two processing machines which are spaced apart from one another, one of said machines adapted to discharge articles in pairs and in phase with one another to the conveyor system, the second of said machines adapted to receive said articles individually in sequence, said conveyor system comprising:

a pair of conveyor chain runs extending lineally from said first processing machine to the second machine;

a plurality of article carriers joined to said chain runs and spaced apart from one another for advancing articles from the first machine toward the second machine;

said conveyor system including a first conveyor section in which said chain runs are displaced laterally apart from one another and arranged to advance pairs of article carriers in phase with one another, thereby to receive the pairs of articles discharged in phase from the first machine;

said conveyor system including a contiguous section wherein said chain runs are disposed in parallelism and adjacent one another and advancing to and through the second machine;

one of said chain runs having an irregular section which increases the developed length of the chain run a sufficient distance to throw said in-phase article carriers out of phase with the article carriers on the other run, whereby said article carriers merge alternately with one another and advance in sequence along said contiguous section with respect to the second machine.

8. A conveyor system as set forth in claim 7 in which the chain runs are disposed in horizontal planes and in which the article carriers comprise conveyor buckets adapted to receive the articles from the first processing machine, the buckets being spaced apart along the conveyor system a distance greater than the width dimension of the buckets, the irregular section increasing the developed length of the chain run a distance equal generally to one-half the spacing of the buckets, thereby to relocate the alternative buckets of the two chain runs and advance the buckets in interleaved formation along the contiguous conveyor section.

9. A conveyor system as set forth in claim 8 in which the conveyor buckets are staggered symmetrically towards one another on said pair of chain runs, whereby the buckets of one chain run partially overhang the companion chain run, adapting the buckets to advance in line formation upon being interleaved along the contiguous conveyor section during advancement to and through the second machine.

10. A conveyor system as set forth in claim 7 in which the two chain runs comprise transport chains located in a horizontal plane, in which the irregular section comprises a compound side bow curve, and in which the transport chains flex in the vertical plane and pass about sprockets in opposite ends of the conveyor system, said transport chains including respective carrier links, said buckets being supported by said carrier links, chain guides for guiding said transport chains in a vertical plane, and carrier link guides for guiding said carrier links and buckets in a horizontal plane.

11. A conveyor system as set forth in claim 10 in which the two transport chains are located in a horizontal plane and in which the transport chains flex in a horizontal plane in passing about the side bow curve of the conveyor system and flex in a vertical plane and pass about sprockets in opposite ends of the conveyor system, said transport chains including respective carrier links, said buckets being supported by said carrier links, chain guides for guiding said transport chains in a vertical plane, and carrier link guides for guiding said carrier links and buckets in a horizontal plane, said carrier link guides extending about said side bow curve and guiding said carrier links, conveyor buckets, and transport chain about the side bow curve.

12. A conveyor system as set forth in claim 7 in which the two chains runs comprise transport chains located in a horizontal plane, the iregular section comprises a compound side bow curve, and in which the transport chains flex in the vertical plane and pass about sprockets in opposite ends of the conveyor system, said transport chains including respective carrier links, said buckets being supported by said carrier links, chain guides for guiding said transport chains in a vertical plane, and carrier link guides for guiding said carrier links and buckets in a horizontal plane, said transport chains including pivot elements extending along horizontal axes and connecting the carrier links to the transport chain, said carrier links including pivotal elements extending along vertical axes, and rollers on the vertical pivot elements of the carrier links, said rollers being translatably confined in said carrier link guides.

References Cited

UNITED STATES PATENTS 2,325,862  8/1943  Jepson _____ 198—75

EVON C. BLUNK, *Primary Examiner.*

R. E. AEGERTER, *Assistant Examiner.*